(12) United States Patent
Lönne

(10) Patent No.: US 11,002,631 B2
(45) Date of Patent: *May 11, 2021

(54) FIBER-OPTIC TESTING SOURCE AND FIBER-OPTIC TESTING RECEIVER FOR MULTI-FIBER CABLE TESTING

(71) Applicant: VIAVI SOLUTIONS INC., San Jose, CA (US)

(72) Inventor: Joachim Lönne, Pliezhausen (DE)

(73) Assignee: VIAVI SOLUTIONS INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/696,692

(22) Filed: Nov. 26, 2019

(65) Prior Publication Data

US 2020/0096416 A1 Mar. 26, 2020

Related U.S. Application Data

(63) Continuation of application No. 15/477,710, filed on Apr. 3, 2017, now Pat. No. 10,508,972.

(51) Int. Cl.
*G01M 11/00* (2006.01)
*G02B 6/38* (2006.01)
(Continued)

(52) U.S. Cl.
CPC ...... *G01M 11/3136* (2013.01); *G01M 11/088* (2013.01); *G01M 11/31* (2013.01);
(Continued)

(58) Field of Classification Search
CPC .... G01M 11/088; G01M 11/30; G01M 11/31; G01M 11/3109; G01M 11/3118;
(Continued)

(56) References Cited

U.S. PATENT DOCUMENTS 8,692,984 B2 4/2014 Schell et al.
9,435,713 B2 9/2016 Collier et al.
(Continued)

FOREIGN PATENT DOCUMENTS

EP 2854307 4/2015

OTHER PUBLICATIONS

Anonymous, "MultiFiber Pro Optical Power Meter and Fiber Test Kits", Fluke Networks, Mar. 6, 2015, 8 pages.

*Primary Examiner* — Gordon J Stock, Jr.
(74) *Attorney, Agent, or Firm* — Mannava & Kang, P.C.

(57) ABSTRACT

According to examples, a fiber-optic testing source for testing a multi-fiber cable may include a laser source communicatively coupled to a plurality of optical fibers connected to a connector. The fiber-optic testing source may include at least one photodiode communicatively coupled to at least one of the plurality of optical fibers by at least one corresponding splitter to implement a communication channel between the fiber-optic testing source and a fiber-optic testing receiver. The communication channel may be operable independently from a polarity associated with the multi-fiber cable. The fiber-optic testing receiver may include a plurality of photodiodes communicatively coupled to a plurality of optical fibers. The fiber-optic testing receiver may include at least one laser source communicatively coupled to at least one of the plurality of optical fibers by at least one corresponding splitter to implement the communication channel between the fiber-optic testing receiver and a fiber-optic testing source.

20 Claims, 18 Drawing Sheets

(51) Int. Cl.
*G01M 11/08* (2006.01)
*G02B 6/43* (2006.01)
*H04B 10/073* (2013.01)

(52) U.S. Cl.
CPC .... *G01M 11/3145* (2013.01); *G01M 11/3154* (2013.01); *G01M 11/3172* (2013.01); *G01M 11/3181* (2013.01); *G01M 11/331* (2013.01); *G01M 11/333* (2013.01); *G01M 11/336* (2013.01); *G01M 11/39* (2013.01); *G02B 6/385* (2013.01); *G02B 6/43* (2013.01); *H04B 10/0731* (2013.01)

(58) Field of Classification Search
CPC ......... G01M 11/3127; G01M 11/3136; G01M 11/3145; G01M 11/3154; G01M 11/3163; G01M 11/3172; G01M 11/3181; G01M 11/319; G01M 11/33; G01M 11/331; G01M 11/332; G01M 11/333; G01M 11/334; G01M 11/335; G01M 11/336; G01M 11/337; G01M 11/338; G01M 11/37; G01M 11/39; G02B 6/385; G02B 6/43

USPC ....................................................... 356/73.1
See application file for complete search history.

(56) References Cited

U.S. PATENT DOCUMENTS

| | | | |
|---|---|---|---|
| 10,012,563 | B1 | 7/2018 | Wang et al. |
| 10,012,564 | B2 | 7/2018 | Irving |
| 10,025,039 | B1 | 7/2018 | Cummings et al. |
| 10,161,829 | B2 | 12/2018 | Brillhart et al. |
| 10,228,519 | B2 * | 3/2019 | Farbert .................. G02B 6/385 |
| 10,288,524 | B2 | 5/2019 | Leclerc et al. |
| 10,508,972 | B2 * | 12/2019 | Lonne .................. G01M 11/336 |
| 2009/0109424 | A1 | 4/2009 | Burnett et al. |
| 2010/0238428 | A1 | 9/2010 | Glines et al. |
| 2013/0194566 | A1 | 8/2013 | Schell et al. |
| 2015/0124246 | A1 | 5/2015 | Collier et al. |
| 2016/0041065 | A1 | 2/2016 | L'Heureux et al. |
| 2017/0234767 | A1 | 8/2017 | Leclerc et al. |
| 2018/0269967 | A1 | 9/2018 | Schell et al. |
| 2018/0340861 | A1 | 11/2018 | Schell et al. |
| 2019/0170610 | A1 * | 6/2019 | Perron .................. G01M 11/33 |
| 2020/0124498 | A1 * | 4/2020 | Leclerc ............. G01D 5/35374 |
| 2020/0249121 | A1 * | 8/2020 | He ......................... G01M 11/33 |
| 2020/0249122 | A1 * | 8/2020 | Kim ...................... G01M 11/334 |

\* cited by examiner

| MPO Power Meter Pin | 1 | 2 | 3 | 4 | 5 | 6 | 7 | 8 | 9 | 10 | 11 | 12 | |
|---|---|---|---|---|---|---|---|---|---|---|---|---|---|
| | → | → | → | → | → | → | → | → | → | → | → | → | |
| MPO Source Pins | 1 | 2 | 3 | 4 | 5 | 6 | 7 | 8 | 9 | 10 | 11 | 12 | Polarity A |
| | 12 | 11 | 10 | 9 | 8 | 7 | 6 | 5 | 4 | 3 | 2 | 1 | Polarity B |
| | 2 | 1 | 4 | 3 | 6 | 5 | 8 | 7 | 10 | 9 | 12 | 11 | Polarity C |

FIG. 5

| MPO Source Pin | | MPO Power Meter Pins | | |
|---|---|---|---|---|
| | | Polarity A | Polarity B | Polarity C |
| 1 | → | 1 | 12 | 2 |
| 2 | → | 2 | 11 | 1 |
| 3 | → | 3 | 10 | 4 |
| 4 | → | 4 | 9 | 3 |
| 5 | → | 5 | 8 | 6 |
| 6 | → | 6 | 7 | 5 |
| 7 | → | 7 | 6 | 8 |
| 8 | → | 8 | 5 | 7 |
| 9 | → | 9 | 4 | 10 |
| 10 | → | 10 | 3 | 9 |
| 11 | → | 11 | 2 | 12 |
| 12 | → | 12 | 1 | 11 |

IMPLEMENT, VIA AT LEAST ONE OPTICAL FIBER OF A PLURALITY OF OPTICAL FIBERS OF A MULTI-FIBER CABLE THAT IS TO BE ANALYZED BY AT LEAST ONE OF A MULTI-FIBER PUSH ON (MPO) POWER METER AND AN MPO SOURCE, A COMMUNICATION CHANNEL BY THE MPO POWER METER AND THE MPO SOURCE TO TRANSMIT DATA FROM THE MPO POWER METER TO THE MPO SOURCE OR FROM THE MPO SOURCE TO THE MPO POWER METER
1202

CAUSE THE DATA TO BE TRANSMITTED BASED ON ACTUATION OF AT LEAST ONE OF THE MPO POWER METER AND THE MPO SOURCE
1204

FIG. 12

FIBER-OPTIC TESTING SOURCE AND FIBER-OPTIC TESTING RECEIVER FOR MULTI-FIBER CABLE TESTING

PRIORITY

This application is a Continuation of commonly assigned and co-pending U.S. patent application Ser. No. 15/477,710, filed Apr. 3, 2017, the disclosure of which is hereby incorporated by reference in its entirety.

BACKGROUND

With respect to fiber-optic networks, a variety of techniques may be used to install, commission, troubleshoot, and/or monitor a fiber-optic network. Some of the techniques may be based on measurement of attributes associated with optical fibers of the fiber-optic network. Results of the attribute measurement may be used to ascertain, for example, whether a device is properly connected to the fiber-optic network and/or a transmission quality of the fiber-optic network.

BRIEF DESCRIPTION OF DRAWINGS

Features of the present disclosure are illustrated by way of examples shown in the following figures. In the following figures, like numerals indicate like elements, in which:

FIG. 5 illustrates examples of connections for the MPO power meter and the MPO source of FIGS. 2 and 3, respectively, to implement a communication channel that is independent of the polarity-A, the polarity-B, and the polarity-C associated with the DUT, according to an example of the present disclosure;

FIG. 8 illustrates examples of connections for the MPO power meter and the MPO source of FIGS. 6 and 7, respectively, to implement a communication channel that is independent of the polarity-A, the polarity-B, and the polarity-C associated with the DUT, according to an example of the present disclosure;

FIG. 12 illustrates a flowchart of a method for fiber-optic network analysis, according to an example of the present disclosure.

DETAILED DESCRIPTION

Figure 1:
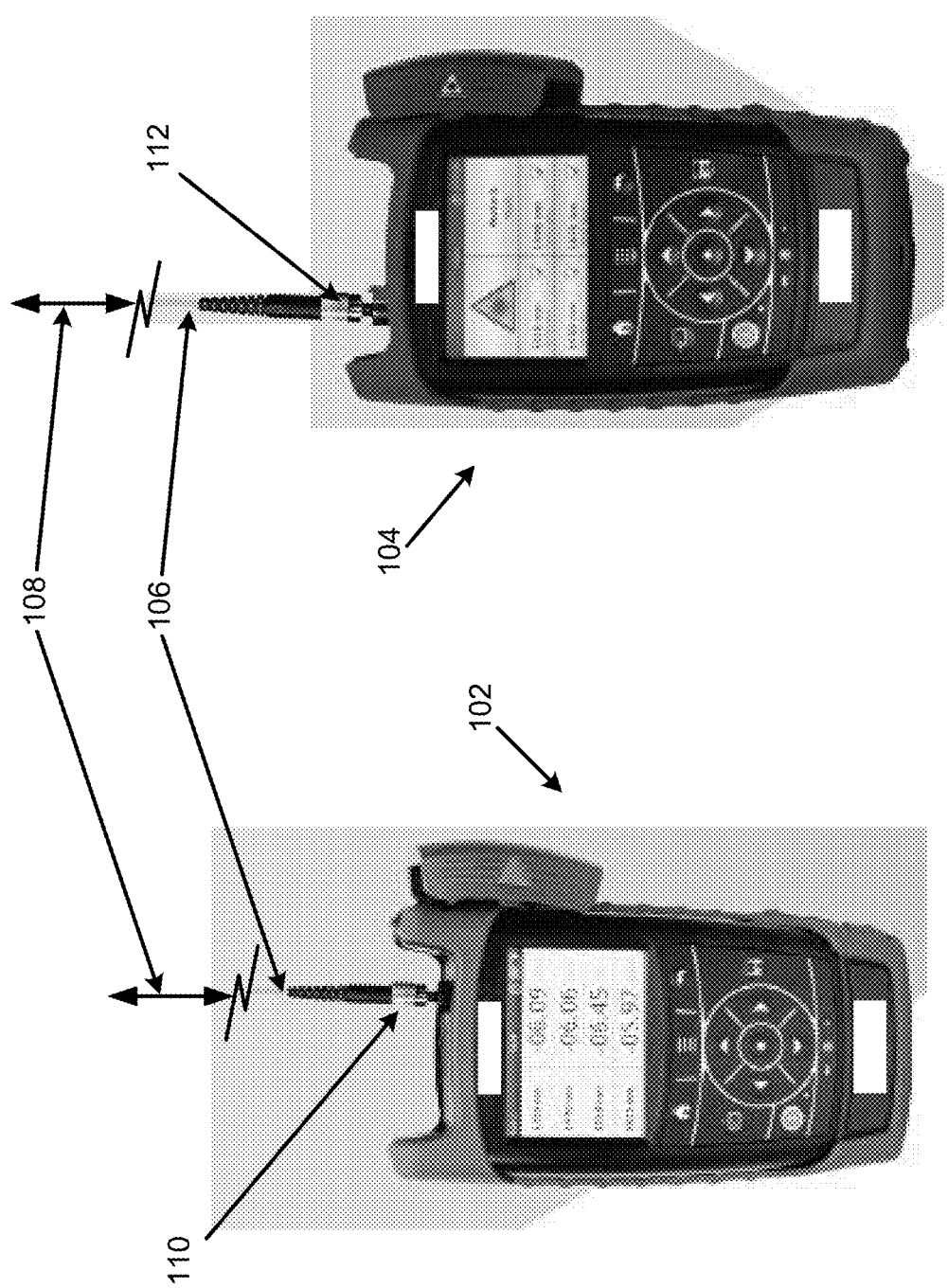
FIG. 1 illustrates an architecture of a fiber-optic testing source and a fiber-optic testing receiver connected to a device under test (DUT), according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, a fiber-optic testing receiver, which may include a Multi-fiber Push On (MPO) power meter, and a fiber-optic testing source, which may include an MPO source, may implement, via at least one optical fiber of a plurality of optical fibers of a device under test (DUT) that is to be analyzed by the MPO power meter and/or the MPO source, a communication channel to transmit data from the MPO power meter to the MPO source or from the MPO source to the MPO power meter. The communication channel may be operable independently from a polarity associated with the DUT. The DUT may include a multi-fiber cable. For example, the multi-fiber cable may include 12, 24, 36, etc., or any number of optical fibers.

According to an example, the communication channel may provide for transmission of commands between the MPO power meter and the MPO source. According to an example, a command of the commands may include instructions from the MPO power meter to control operations of the MPO source, and vise-versa. In this regard, a user of the MPO power meter and the MPO source may control operations of both devices from either one of the devices.

According to an example, the communication channel may provide bi-directional transmission of a confirmation of a connection of the MPO power meter and/or the MPO source to the DUT. In this regard, a user of the MPO power meter and the MPO source may ascertain when the MPO power meter and/or the MPO source is connected to the DUT, without the need to physically confirm whether the MPO power meter and/or the MPO source is connected to the DUT.

According to an example, a fiber-optic testing source for testing a multi-fiber cable may include a laser source communicatively coupled to a plurality of optical fibers connected to a connector. Further, the fiber-optic testing source may include at least one photodiode communicatively coupled to at least one of the plurality of optical fibers by at least one corresponding splitter to implement a communication channel between the fiber-optic testing source and a fiber-optic testing receiver. The communication channel may be operable independently from a polarity associated with the multi-fiber cable.

According to an example, for the fiber-optic testing source, the plurality of optical fibers may include twelve optical fibers, and the at least one photodiode may further include three photodiodes communicatively coupled to three of the plurality of optical fibers by three corresponding splitters to implement the communication channel between the fiber-optic testing source and the fiber-optic testing receiver.

According to an example, for the fiber-optic testing source, the communication channel may be operable independently from three polarities including the polarity associated with the multi-fiber cable. For example, the polarities may include a polarity-A for which a first optical fiber of the twelve optical fibers associated with the connector is communicatively coupled to a first optical fiber associated with a connector of the fiber-optic testing receiver that includes twelve optical fibers, a polarity-B for which a twelfth optical fiber associated with the connector of the fiber-optic testing source is communicatively coupled to the first optical fiber associated with the connector of the fiber-optic testing receiver, and a polarity-C for which a second optical fiber associated with the connector of the fiber-optic testing source is communicatively coupled to the first optical fiber associated with the connector of the fiber-optic testing receiver.

According to an example, for the fiber-optic testing source, the communication channel implemented by the laser source and the at least one photodiode may provide bi-directional transmission of data between the fiber-optic testing source and the fiber-optic testing receiver.

According to an example, for the fiber-optic testing source, the communication channel implemented by the laser source and the at least one photodiode may provide transmission of commands between the fiber-optic testing source and the fiber-optic testing receiver. For example, a command of the commands may include instructions from the fiber-optic testing source to control operations of the fiber-optic testing receiver.

According to an example, for the fiber-optic testing source, the communication channel implemented by the laser source and the at least one photodiode may provide bi-directional transmission of a confirmation of a connection of the fiber-optic testing source and the fiber-optic testing receiver to the multi-fiber cable.

According to an example, for the fiber-optic testing source, the connector may include an MPO connector.

According to an example, a fiber-optic testing receiver for testing a multi-fiber cable may include a plurality of photodiodes communicatively coupled to a plurality of optical fibers. Further, the fiber-optic testing receiver may include at least one laser source communicatively coupled to at least one of the plurality of optical fibers by at least one corresponding splitter to implement a communication channel between the fiber-optic testing receiver and a fiber-optic testing source. The optical fibers may be connected to a connector. Further, the communication channel may be operable independently from a polarity associated with the multi-fiber cable.

According to an example, for the fiber-optic testing receiver, the plurality of optical fibers may include twelve optical fibers, and the at least one laser source may further include three laser sources communicatively coupled to three of the plurality of optical fibers by three corresponding splitters to implement the communication channel between the fiber-optic testing receiver and the fiber-optic testing source.

According to an example, for the fiber-optic testing receiver, the communication channel may be operable independently from three polarities including the polarity associated with the multi-fiber cable, and the polarities may include a polarity-A for which a first optical fiber of the twelve optical fibers associated with the connector is communicatively coupled to a first optical fiber associated with a connector of the fiber-optic testing source that includes twelve optical fibers, a polarity-B for which a twelfth optical fiber associated with the connector of the fiber-optic testing receiver is communicatively coupled to the first optical fiber associated with the connector of the fiber-optic testing source, and a polarity-C for which a second optical fiber associated with the connector of the fiber-optic testing receiver is communicatively coupled to the first optical fiber associated with the connector of the fiber-optic testing source.

According to an example, for the fiber-optic testing receiver, the communication channel implemented by the at least one laser source and the plurality of photodiodes may provide bi-directional transmission of data between the fiber-optic testing receiver and the fiber-optic testing source.

FIG. 1 illustrates an architecture of a fiber-optic testing source and a fiber-optic testing receiver connected to a DUT, according to an example of the present disclosure.

Referring to FIG. 1, with respect to fiber-optic network analysis as disclosed herein, the fiber-optic testing receiver and the fiber-optic testing source may respectively include an MPO power meter 102 and an MPO source 104 operatively connectable to a DUT 106. In the example of FIG. 1, the MPO power meter 102 and the MPO source 104 are illustrated as being operatively connected to the DUT 106. The DUT 106 may include a plurality of DUT optical fibers. For example, the DUT 106 may include 12, 24, 48, or any number of optical fibers.

The MPO power meter 102 may provide for pass/fail fiber inspection of the DUT optical fibers, and optical power measurement (OPM) with respect to the DUT optical fibers. The MPO power meter 102 may provide for implementation of fiber-optic network power and/or loss test applications. Further, the MPO power meter 102 may provide for measurement of polarity associated with the DUT 106.

The MPO source 104 may provide for fiber-optic network qualification and certification. The MPO source 104 may provide for link loss testing and long-haul, and access telecommunication network characterization, as well as data center and local area network testing. The link loss may be measured, for example, by comparing a reference value associated with the optical fibers of the DUT 106, with a value measured by the MPO power meter 102 and the MPO source 104.

The MPO power meter 102 and the MPO source 104 may provide for the exchange of information, via the DUT 106, with respect to any type of testing, based on the implementation of a communication channel 108 as disclosed herein. For example, with respect to DUT wavelength measurement, the MPO source 104 may forward, to the MPO power meter 102, information with respect to emitted wavelengths to set corresponding wavelengths on the MPO power meter 102. Thus, the communication channel 108 may provide for the exchange of measurement results with respect to the MPO power meter 102 and the MPO source 104. As disclosed herein, the communication channel 108 may be part of the DUT 106.

With respect to the communication channel 108, the MPO power meter 102 and the MPO source 104 may also provide for the display of identical information on both the MPO power meter 102 and the MPO source 104. In this regard, the communication channel 108 may provide for the simultaneous display of measurement results with respect to the MPO power meter 102 and the MPO source 104. For example, any values associated with loss, length, polarity, etc., measured by the MPO source 104 may be displayed on the MPO power meter 102, and vise-versa.

With respect to the communication channel 108, the MPO power meter 102 and the MPO source 104 may display (or otherwise generate) an indication of connection of the MPO power meter 102 and/or the MPO source 104 to the DUT 106. In this regard, the communication channel 108 may provide an indication on the MPO source 104 as to whether the MPO power meter 102 is connected to the DUT 106, and vise-versa. For example, a user of the MPO source 104 may verify, based on a display on the MPO source 104, whether the MPO power meter 102 is connected to the DUT 106, and vise-versa.

With respect to the communication channel 108, the MPO power meter 102 may be controllable by the MPO source 104, and vise-versa. In this regard, the communication channel 108 may be used to initiate a measurement (e.g., with respect to loss, length, polarity, etc.) from the MPO source 104 or the MPO power meter 102. For example, the MPO power meter 102 may be designated as a master sensor that forwards commands via the communication channel 108 to the MPO source 104 to perform various actions, such as initiating loss measurement, etc. Other types of commands that may be sent via the communication channel 108 may include switching the MPO source 104 to a different channel, turning the laser module of the MPO source 104 on/off, etc.

Figure 2:
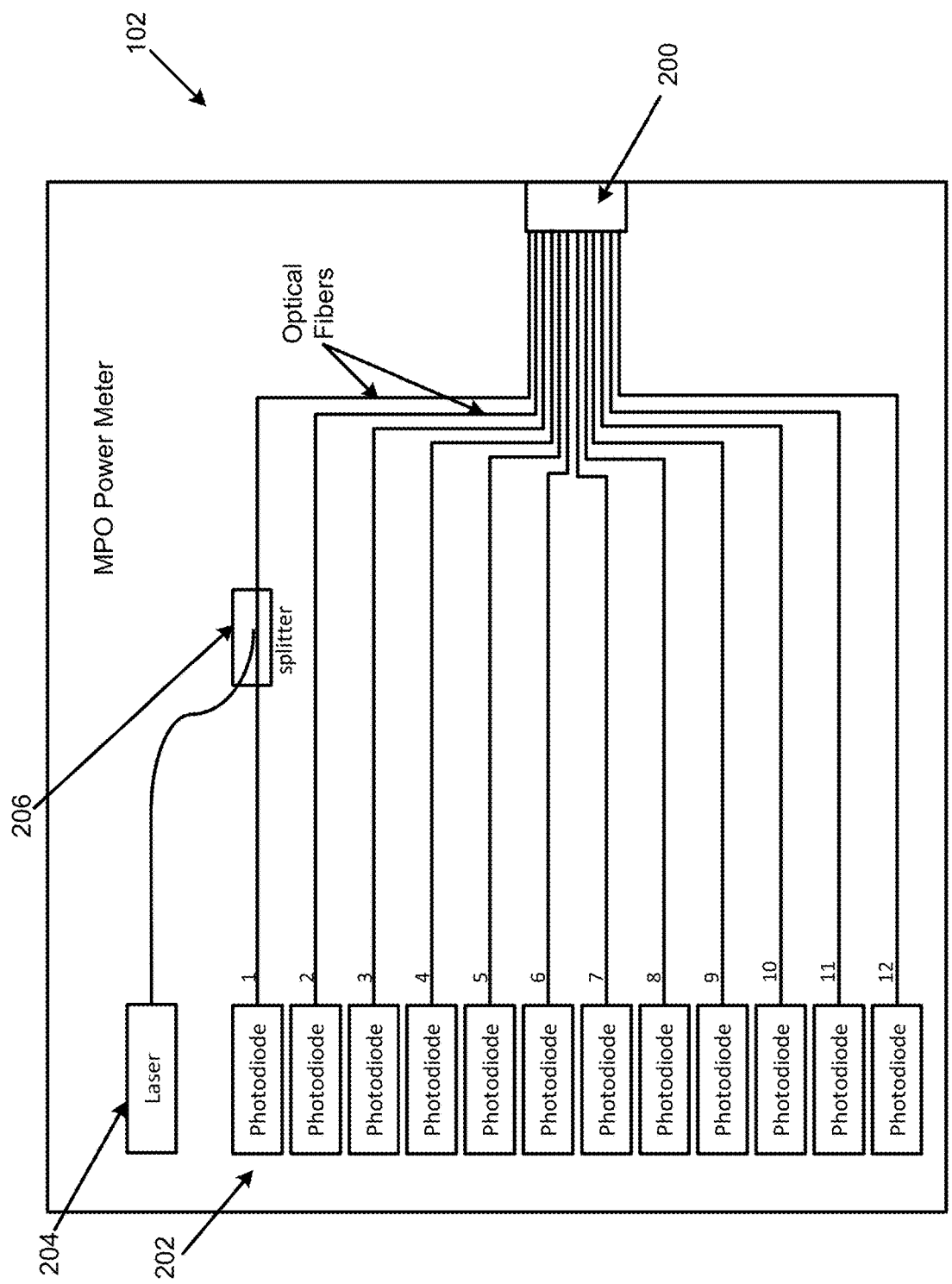
FIG. 2 illustrates an architecture of a Multi-fiber Push On (MPO) power meter usable as the fiber-optic testing receiver of FIG. 1, according to an example of the present disclosure.

FIG. 2 illustrates an architecture of the MPO power meter 102 usable as the fiber-optic testing receiver of FIG. 1, according to an example of the present disclosure.

Referring to FIG. 2, the MPO power meter 102 may include an MPO power meter connector 200 that includes, for example, 12, 24, 48, or any number of optical fibers combined in one connector. For the example of FIG. 2, the MPO power meter 102 may include twelve optical fibers (denoted optical fiber-1 to optical fiber-12). Further, the MPO power meter 102 may include twelve photodiodes 202. Each photodiode may be connected to an associated optical fiber of the MPO power meter connector 200 that is located at a front end (e.g., the right side of FIG. 2) of the MPO power meter 102. A laser source 204 may be communicatively coupled to an optical fiber by a corresponding splitter 206. For the example of FIG. 2, the laser source 204 may be communicatively coupled to optical fiber-1 by the corresponding splitter 206. However, the laser source 204 may be communicatively coupled to other optical fibers by corresponding splitters as disclosed herein. With respect to the MPO power meter 102, the photodiodes 202 (i.e., the photodiode connected to the optical fiber that includes the splitter 206), the laser source 204, and the splitter 206 may implement the communication channel 108 between the MPO power meter 102 and the MPO source 104. Further, the communication channel 108 may be operable independently from a polarity associated with the DUT 106 as disclosed herein.

Figure 3:
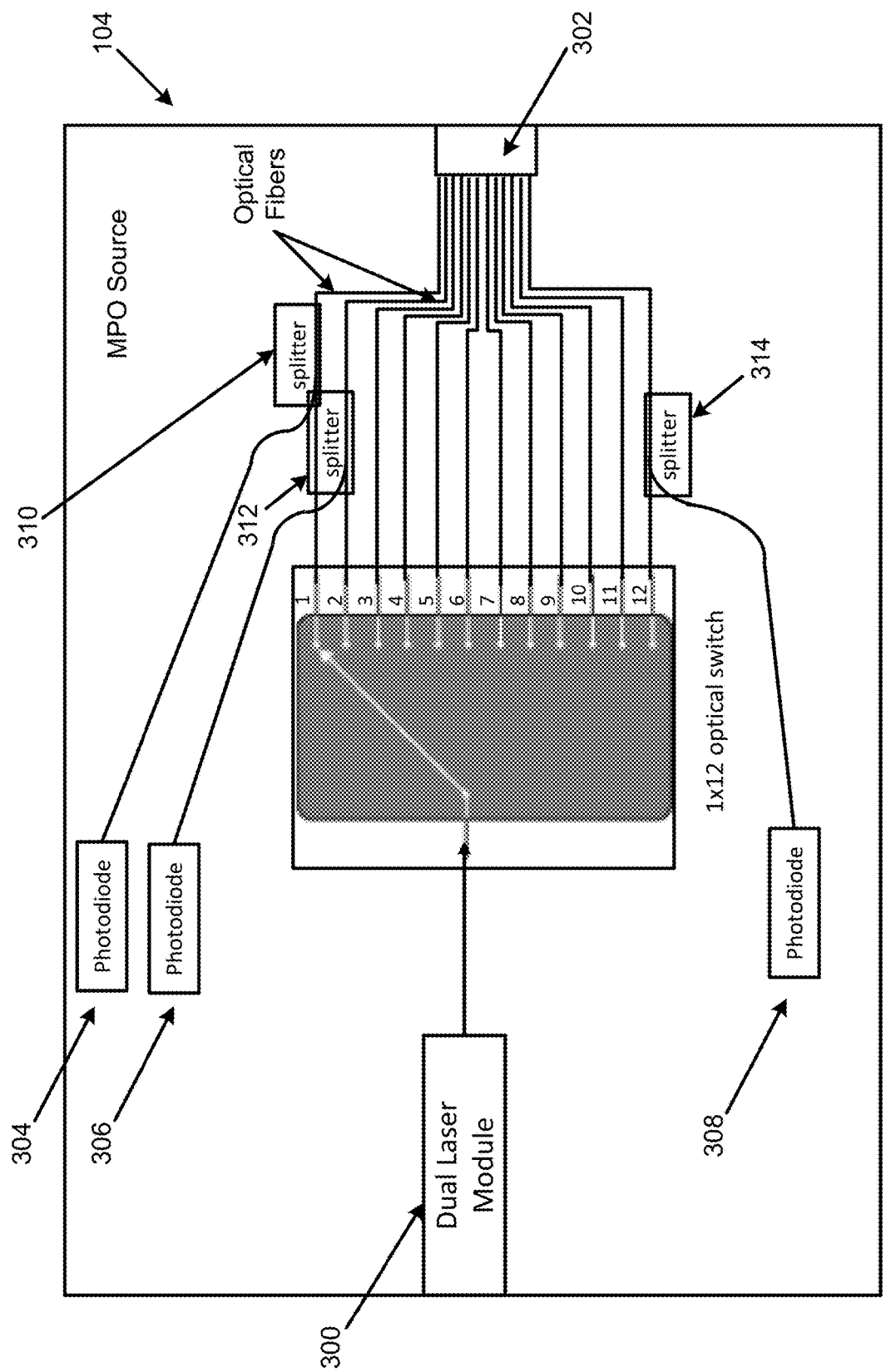
FIG. 3 illustrates an architecture of an MPO source usable as the fiber-optic testing source of FIG. 1, according to an example of the present disclosure.

FIG. 3 illustrates an architecture of the MPO source 104 usable as the fiber-optic testing source of FIG. 1, according to an example of the present disclosure.

Referring to FIG. 3, the MPO source 104 may include a dual laser module 300 that includes a laser (or LED) source. The laser source may include a single laser or twelve lasers. Compared to the MPO power meter 102, the MPO source 104 may similarly include an MPO source connector 302 that is located at a front end (e.g., the right side of FIG. 3) thereof. The MPO source 104 may include the dual laser module 300 connected to a 1×12 optical switch that is to apply a laser signal to one of the twelve optical fibers. Alternatively, the MPO source 104 may include twelve individual lasers applied to twelve optical fibers. Photodiodes 304, 306, and 308 may be communicatively coupled to optical fibers by corresponding splitters 310, 312, and 314. For the example of FIG. 3, the photodiodes 304, 306, and 308 may be communicatively coupled to optical fiber-1, optical fiber-2, and optical fiber-12 by the corresponding splitters 310, 312, and 314. However, the photodiodes 304, 306, and 308 may be communicatively coupled to other optical fibers by corresponding splitters as disclosed herein. With respect to the MPO source 104, the dual laser module 300, the photodiodes 304, 306, and 308, and the corresponding splitters 310, 312, and 314 may implement the communication channel 108 between the MPO power meter 102 and the MPO source 104.

Referring to FIGS. 1-3, the DUT 106 may include DUT connectors 110 and 112 that are respectively connectable to the MPO power meter connector 200 and the MPO source connector 302. Thus, according to an example, operation of the MPO power meter 102 and the MPO source 104 may include connecting the MPO power meter 102 and the MPO source 104 to the DUT 106 via the corresponding connectors.

Figure 4:
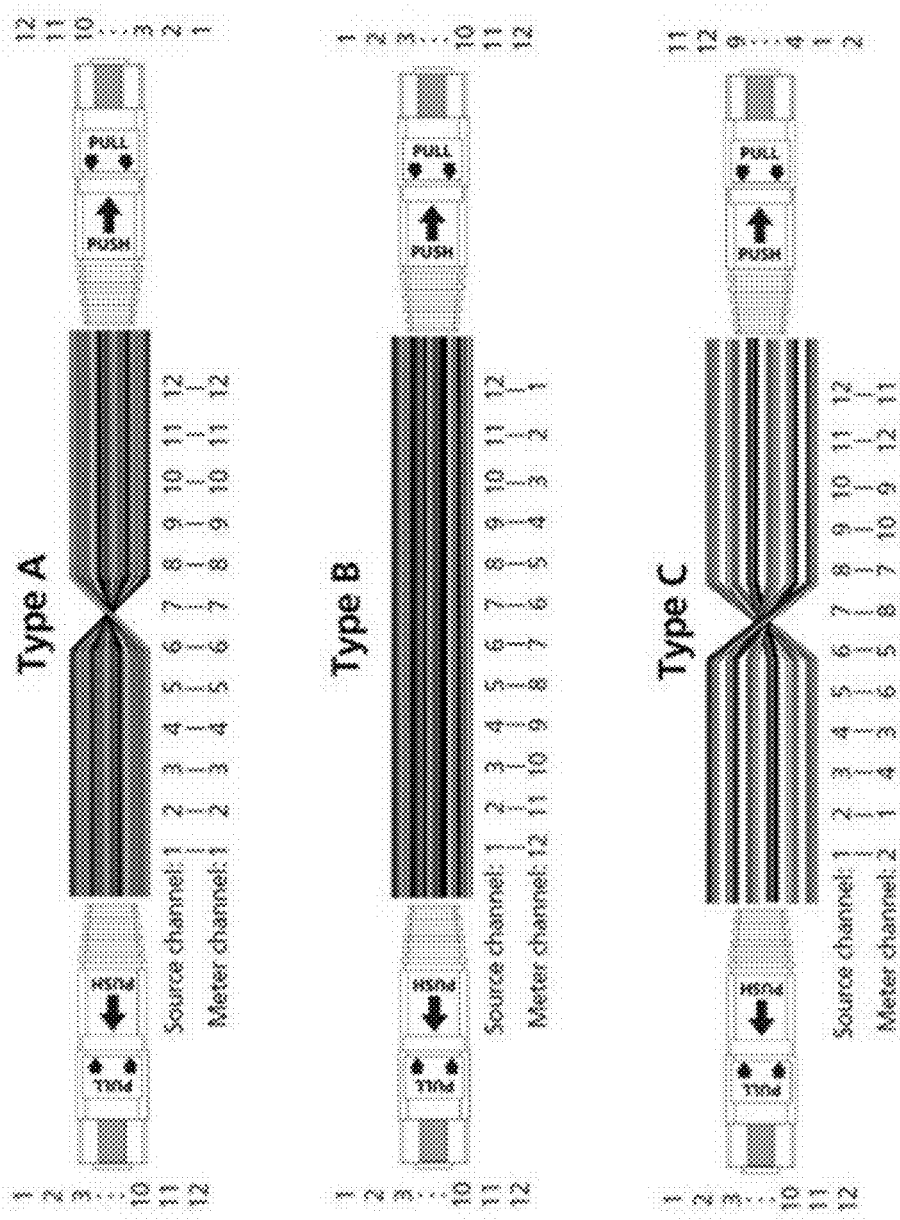
FIG. 4 illustrates examples of polarity-A, polarity-B, and polarity-C associated with the DUT, according to an example of the present disclosure.

FIG. 4 illustrates examples of polarity-A, polarity-B, and polarity-C associated with the DUT 106, according to an example of the present disclosure.

Referring to FIGS. 2-4, and particularly FIG. 4, with respect to polarity, the connection between opposing ends of the DUT 106 may include different polarities. For example, the connection between opposing ends of the DUT 106 may include polarities A, B, and C. Alternatively, the connection between opposing ends of the DUT 106 may include fewer or additional polarities compared to the polarities A, B, and C. The polarity-A may represent a connection of pin 1 of the MPO source 104 to pin 1 of the MPO power meter 102, pin 2 of the MPO source 104 to pin 2 of the MPO power meter 102, etc., as shown in FIG. 4. A pin may represent a connection at the MPO power meter connector 200 (or the MPO source connector 302) into which an optical fiber is inserted or otherwise connected. The polarity-B may represent a connection of pin 1 of the MPO source 104 to pin 12 of the MPO power meter 102, pin 2 of the MPO source 104 to pin 11 of the MPO power meter 102, etc., as shown in FIG. 4. The polarity-C may represent a connection of pin 1 of the MPO source 104 to pin 2 of the MPO power meter 102, pin 2 of the MPO source 104 to pin 1 of the MPO power meter 102, etc., as shown in FIG. 4.

As disclosed herein, the MPO power meter 102 may provide for measurement of polarity associated with the DUT 106. The polarity may be measured, for example, by determining a channel associated with a source signal at the MPO source 104 and a corresponding channel associated with a received signal at the MPO power meter 102. For example, if the source signal originates at pin 1 (corresponding to channel 1) of the MPO source 104 and the received signal is received at pin 1 (corresponding to channel 1) of the MPO power meter 102, based on the polarity chart of FIG. 4, the polarity may be determined as polarity-A. Similarly, if the source signal originates at pin 1 of the MPO source 104 and the received signal is received at pin 12 of the MPO power meter 102, based on the polarity chart of FIG. 4, the polarity may be determined as polarity-B, and so forth with respect to polarity-C, and any other polarities.

FIG. 5 illustrates examples of connections for the MPO power meter 102 and the MPO source 104 of FIGS. 2 and 3, respectively, to implement the communication channel 108 that is independent of the polarity-A, the polarity-B, and the polarity-C associated with the DUT, according to an example of the present disclosure.

Referring to FIGS. 4 and 5, for the example of FIGS. 2 and 3, in order to implement the communication channel 108, for the MPO power meter 102, the photodiodes 202 (i.e., the photodiode connected to the optical fiber that includes the splitter 206), the laser source 204, and the splitter 206 may be connected to pin 1 associated with optical fiber-1, and for the MPO source 104, the dual laser module 300, the photodiodes 304, 306, and 308, and the corresponding splitters 310, 312, and 314 may be connected to pins 1, 2, and 12. In this manner, the laser source 204 and the corresponding splitter 206 of the MPO power meter 102, and the photodiodes 304, 306, and 308, and the corresponding splitters 310, 312, and 314 of the MPO source 104 may be connected in accordance with the connection options illustrated in FIGS. 4 and 5. For example, instead of the connection example of FIGS. 2 and 3, the laser source 204 and the corresponding splitter 206 of the MPO power meter 102 may be connected to pin 2, and the photodiodes 304, 306, and 308, and the corresponding splitters 310, 312, and 314 of the MPO source 104 may be connected to pins 2, 1, and 11, etc. In this manner, the MPO power meter 102 and the MPO source 104 may be configured to implement the communication channel 108 that provides for communication independently of the polarity associated with the DUT 106. Further, the number of photodiodes and corresponding splitters of the MPO source 104 may correspond to the number of polarities associated with the DUT 106, and may accordingly be increased or decreased based on the number of polarities associated with the DUT 106.

Referring again to FIG. 2, as disclosed herein, in order to implement the communication channel 108, the photodiodes 202 (i.e., the photodiode connected to the optical fiber that includes the splitter 206), the laser source 204, and the splitter 206 may be included in the MPO power meter 102. Further, referring to FIG. 3, with respect to the communication channel 108, the dual laser module 300, the photodiodes 304, 306, and 308, and the corresponding splitters 310, 312, and 314 may be included in the MPO source 104.

Figure 6:
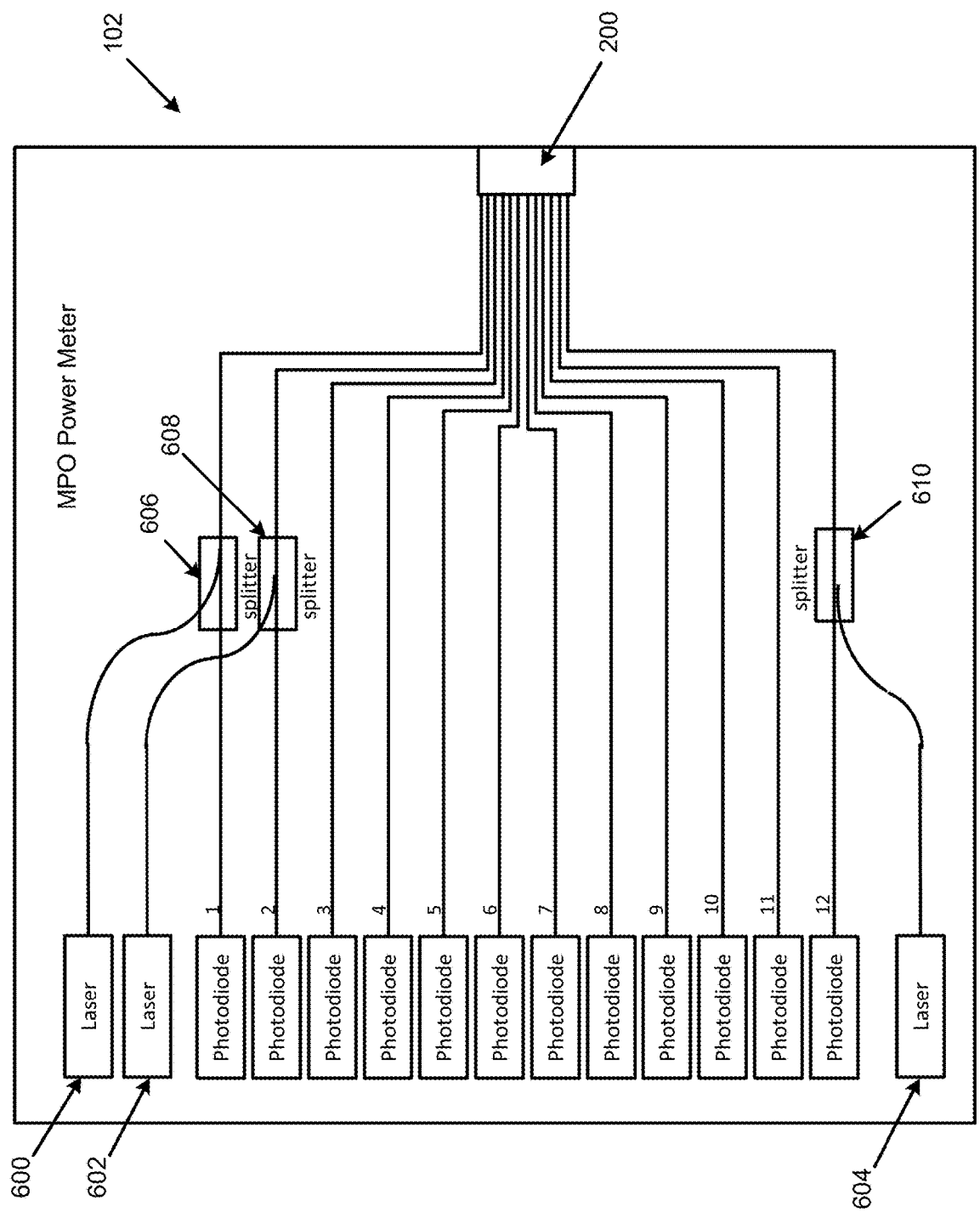
FIG. 6 illustrates another architecture of the MPO power meter usable as the fiber-optic testing receiver of FIG. 1, according to an example of the present disclosure.

Alternatively, referring to FIG. 6 that illustrates another architecture of the MPO power meter 102 usable as the fiber-optic testing receiver of FIG. 1, in order to implement the communication channel 108, laser sources 600, 602, and 604, and corresponding splitters 606, 608, and 610 may be included in the MPO power meter 102. Further, referring to FIG. 7 that illustrates another architecture of the MPO source 104 usable as the fiber-optic testing source of FIG. 1, with respect to the communication channel 108, a photodiode 700 and a corresponding splitter 702 may be included in the MPO source 104.

Figure 7:
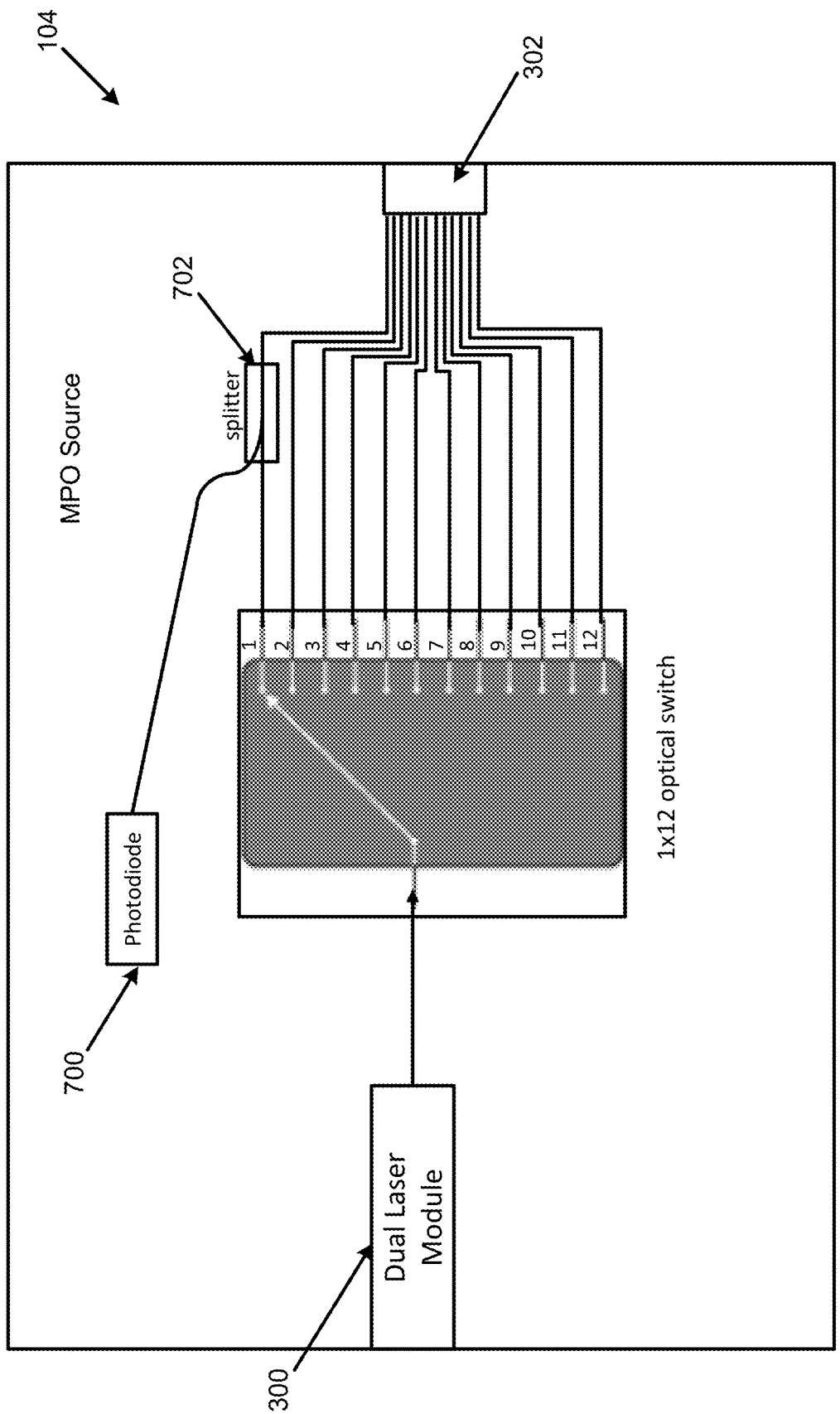
FIG. 7 illustrates another architecture of the MPO source usable as the fiber-optic testing source of FIG. 1, according to an example of the present disclosure.

FIG. 8 illustrates examples of connections for the MPO power meter and the MPO source of FIGS. 6 and 7, respectively, to implement the communication channel 108 that is independent of the polarity-A, the polarity-B, and the polarity-C associated with the DUT, according to an example of the present disclosure.

For the alternative example of FIGS. 6-8, in order to implement the communication channel 108, the laser sources 600, 602, and 604, and the corresponding splitters 606, 608, and 610 of the MPO power meter 102 may be connected to pins 1, 2, and 12, and the photodiode 700 and the corresponding splitter 702 of the MPO source 104 may be connected to pin 1. In this manner, the laser sources 600, 602, and 604, and the corresponding splitters 606, 608, and 610 of the MPO power meter 102, and the photodiode 700 and the corresponding splitter 702 of the MPO source 104 may be connected in accordance with the connection options illustrated in FIG. 8. According to another example, instead of the connection example of FIGS. 6 and 7, the laser sources 600, 602, and 604, and the corresponding splitters 606, 608, and 610 of the MPO power meter 102 may be connected to pins 2, 1, and 11, and the photodiode 700 and the corresponding splitter 702 of the MPO source 104 may be connected to pin 2, etc.

Referring to FIG. 5 (and similarly for FIG. 8), the correspondence between the laser source 204 and the splitter 206 of the MPO power meter 102, and the photodiodes 304, 306, and 308 and splitters 310, 312, and 314 of the MPO source 104 may be determined based on an analysis of the correspondence between the different channels and the associated polarity. For example, referring to FIG. 4, for the laser source 204 and the splitter 206 of the MPO power meter 102 connected to pin 1, for polarity-A, polarity-B, and polarity-C, the photodiodes 304, 306, and 308 and splitters 310, 312, and 314 of the MPO source 104 may be respectively connected to pins 1, 2, and 12.

Referring again to FIGS. 2-5 (and similarly for FIGS. 6-8), the inclusion of the laser source 204 and the corresponding splitter 206 in the MPO power meter 102, and the photodiodes 304, 306, and 308 and corresponding splitters 310, 312, and 314 in the MPO source 104 may provide for implementation of the communication channel 108, determination of whether the MPO source 104 and MPO power meter 102 are connected to the DUT 106, loss and length measurement capabilities with respect to the DUT 106, and/or detection of the polarity associated with the DUT 106. In this regard, for the example of FIG. 2, the addition of the laser source 204 for the MPO power meter 102 provides a source for transmitting signals to the MPO source 104. Further, for the example of FIG. 3, the addition of the photodiodes 304, 306, and 308 for the MPO source 104 provides receivers of transmitted signals from the MPO power meter 102.

As disclosed herein, the communication channel 108 may be provided for the exchange of various types of data, commands, etc., between the MPO power meter 102 and the MPO source 104. In this regard, the communication channel 108 may be provided for the exchange, for example, of RS-232 protocol based communication between the MPO source 104 and the MPO power meter 102. The RS-232 protocol based communication may represent a standard for serial communication transmission of data. The MPO power meter 102 may send, for example, via the laser source 204, RS-232 protocol based communication that includes commands to the MPO source 104. Depending on the polarity associated with the DUT 106, the RS-232 protocol based communication may be received by the MPO source 104 via a specified photodiode based on a particular polarity (e.g., polarity-A, polarity-B, or polarity-C). Examples of commands may include Standard Commands for Programmable Instruments (SCPI) commands. The SCPI commands may be described as commands based on a standard for syntax and commands that are used for controlling programmable test and measurement devices. Thus, the SCPI commands may be used by the MPO power meter 102 to control operations of the MPO source 104.

According to an example, with respect to the commands exchanged between the MPO power meter 102 and the MPO source 104 as disclosed herein, the laser source 204 of the MPO power meter 102 may forward a command to the MPO source 104 to return an identification (ID) of the MPO source 104. Once the MPO source 104 ID is received by a specified photodiode of the MPO power meter 102, a connection may be established between the MPO power meter 102 and the MPO source 104 so that the MPO power meter 102 may control operations of the MPO source 104 (and vise-versa). A confirmation of the connection between the MPO power meter 102 and the MPO source 104 may be displayed on the display screens (e.g., see FIG. 1) of the MPO power meter 102 and/or the MPO source 104, and/or indicated as an audible signal. When the MPO power meter 102 performs analyses of DUT attributes such as loss measurement, polarity determination, etc., with respect to the DUT 106, the values of the DUT attributes measured by the MPO power meter 102 may be transmitted back to the MPO source 104. Once the MPO power meter 102 and the MPO source 104 are connected to the DUT 106, displays and/or commands may be shared between the MPO power meter 102 and the MPO source 104.

Figure 9:
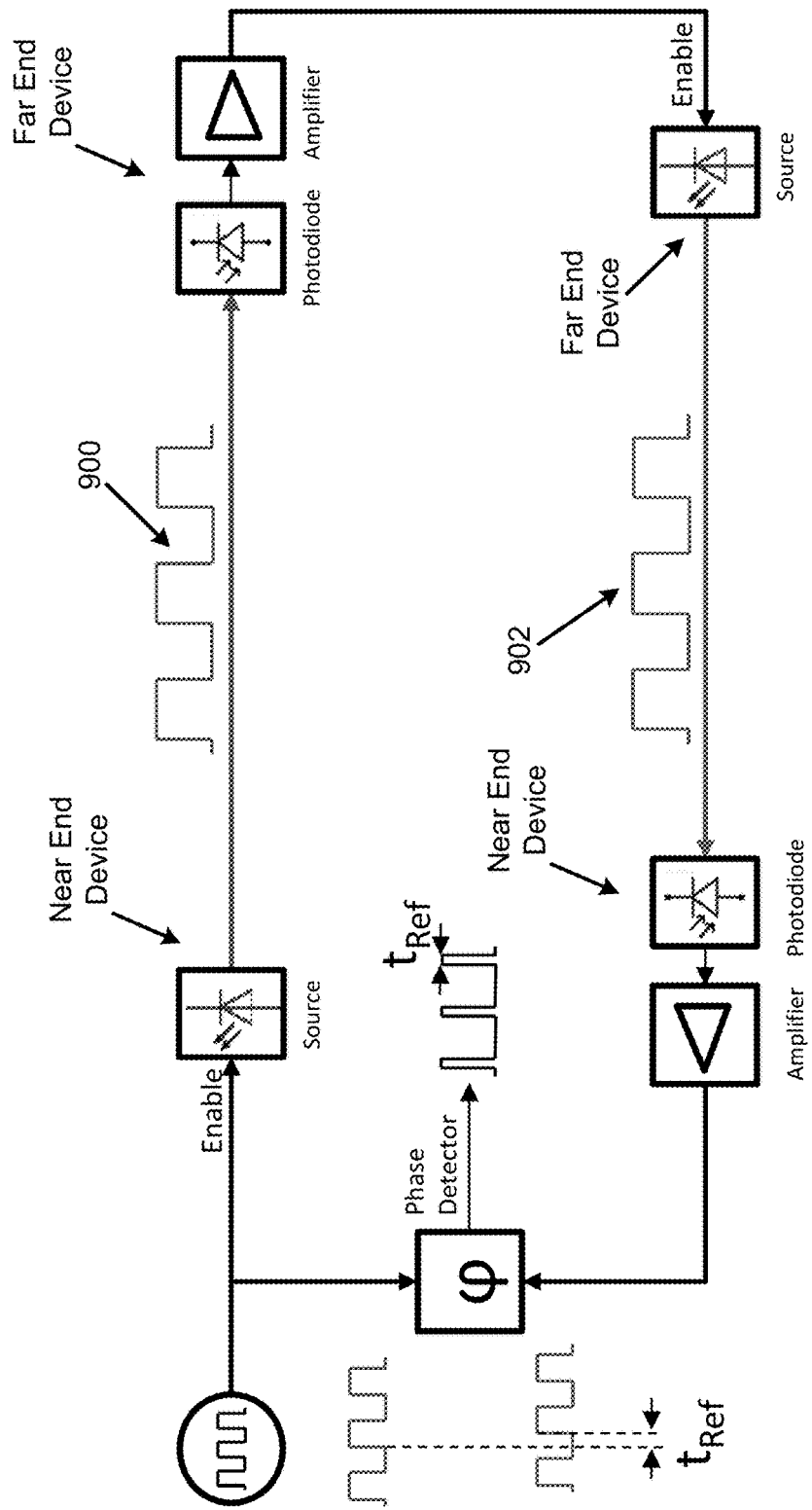
FIGS. 9 and 10 illustrate $t_{Ref}$ and $t_1$ determination for DUT length measurement for the MPO power meter and the MPO source of FIGS. 2, 3, 6, and 7, respectively, according to an example of the present disclosure.
Figure 10:
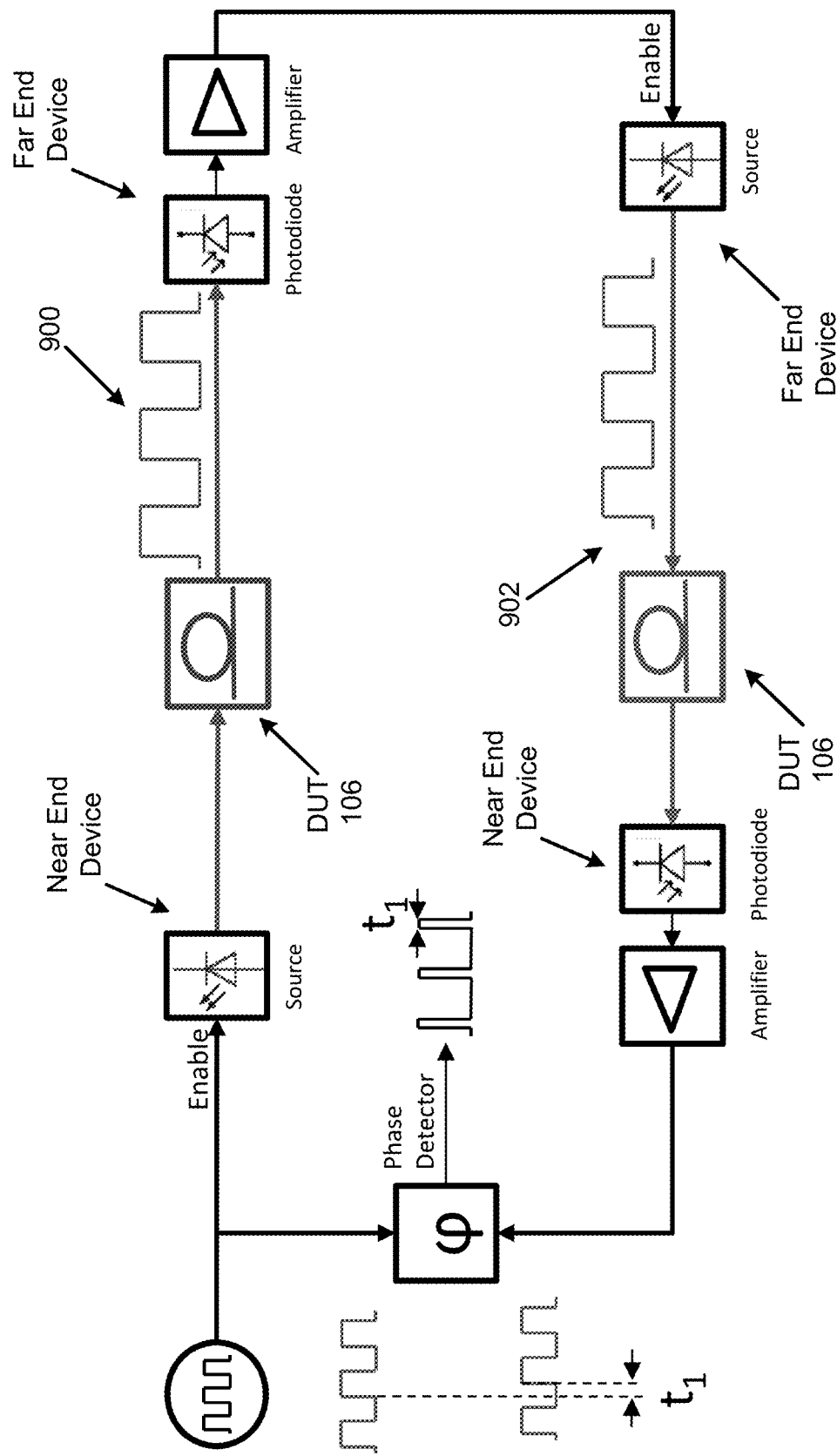

FIGS. 9 and 10 illustrate $t_{Ref}$ and $t_1$ determination for DUT length measurement for the MPO power meter and the MPO source of FIGS. 2, 3, 6, and 7, respectively, according to an example of the present disclosure.

Referring to FIG. 9, with respect to DUT length measurement, a modulated signal at 900 may be sent from a near end device (e.g., the MPO power meter 102 or the MPO source 104), for example, through optical fiber-1 for the example of FIGS. 2 and 3, to the optical receiver of a far end device (e.g., the other one of the MPO power meter 102 or the MPO source 104). The source for the near end device may include a laser source, and a receiver of the far end device may include a photodiode. The electrical output signal of the receiver of the far end device may control its source, and may mirror the modulated signal (i.e., to generate a mirrored signal 902) back to the near end device, for example, through optical fiber-2. The mirrored signal 902 may be generated by the far end device based on an analysis of the modulated signal at 900. For example, the mirrored signal 902 may represent a signal that is generated (i.e., not reflected) by the far end device. The near end device may measure the phase between the outgoing and incoming signals, which corresponds to the length of optical fiber-1 and optical fiber-2. In this regard, referring to FIG. 9, the near end device may measure the phase between the outgoing and incoming signals to determine a reference delay time ($t_{Ref}$) associated with a specified length optical fiber (e.g., a 2 m length optical fiber). Referring to FIG. 10, the near end device may measure the phase between the outgoing and incoming signals (i.e., the signals 900 and 902) to determine a delay time ($t_1$) associated with the DUT 106 (e.g., a 3 Km length DUT). The length of the optical fibers associated with the outgoing and incoming signals may be determined as follows:

$$\text{Length}=c*(t_1-t_{Ref})/n$$

For the length of the optical fibers associated with the outgoing and incoming signals, c may represent the speed of light, and n may represent a refractive index of the optical fibers associated with the outgoing and incoming signals. Assuming that optical fiber-1 and optical fiber-2 associated with the outgoing and incoming signals include an identical length, the length of the DUT 106 may be determined by dividing the length of optical fiber-1 and optical fiber-2 associated with the outgoing and incoming signals in one-half.

FIGS. 11A-11L illustrate various graphical user interface (GUI) displays for the MPO power meter 102 and the MPO source 104 of FIGS. 2, 3, 6, and 7, respectively, according to an example of the present disclosure.

Figures 11A, 11B:
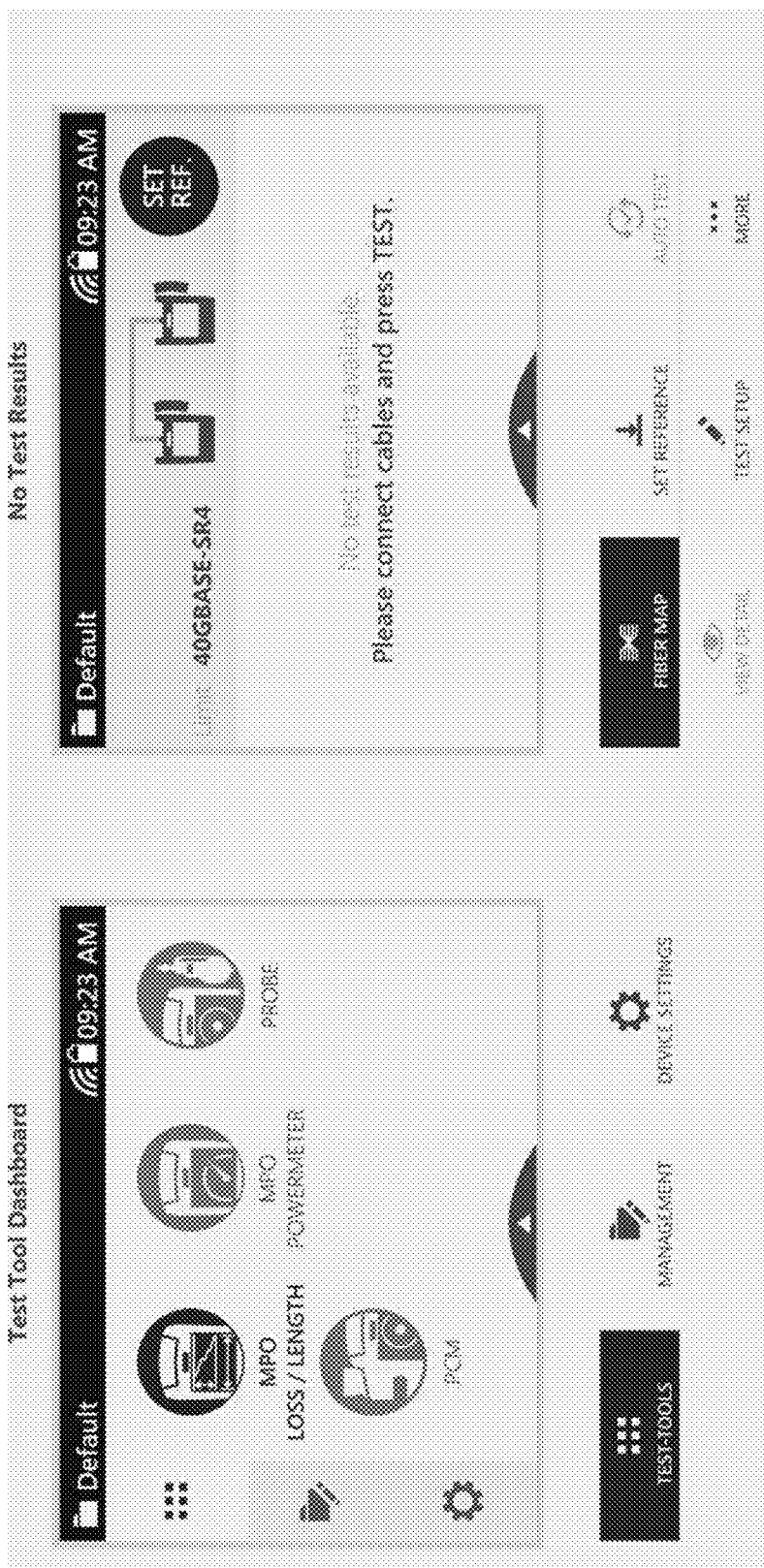
FIGS. 11A-11L illustrate various graphical user interface (GUI) displays for the MPO power meter and the MPO source of FIGS. 2, 3, 6, and 7, respectively, according to an example of the present disclosure.

Referring to FIG. 11A, a GUI display for the MPO power meter 102 and/or the MPO source 104 may include options to power on/off the MPO power meter 102. Further options may include icons to initiate DUT loss and/or length measurement, and options to modify MPO power meter 102 and/or the MPO source 104 settings.

Referring to FIG. 11B, a GUI display for the MPO power meter 102 and/or the MPO source 104 may include a display of a connection status of the MPO power meter 102 and the MPO source 104 to the DUT 106. If the MPO power meter 102 and/or the MPO source 104 are not connected to the DUT 106, a display may be generated to request connection of the MPO power meter 102 and/or the MPO source 104.

Figures 11C, 11D:
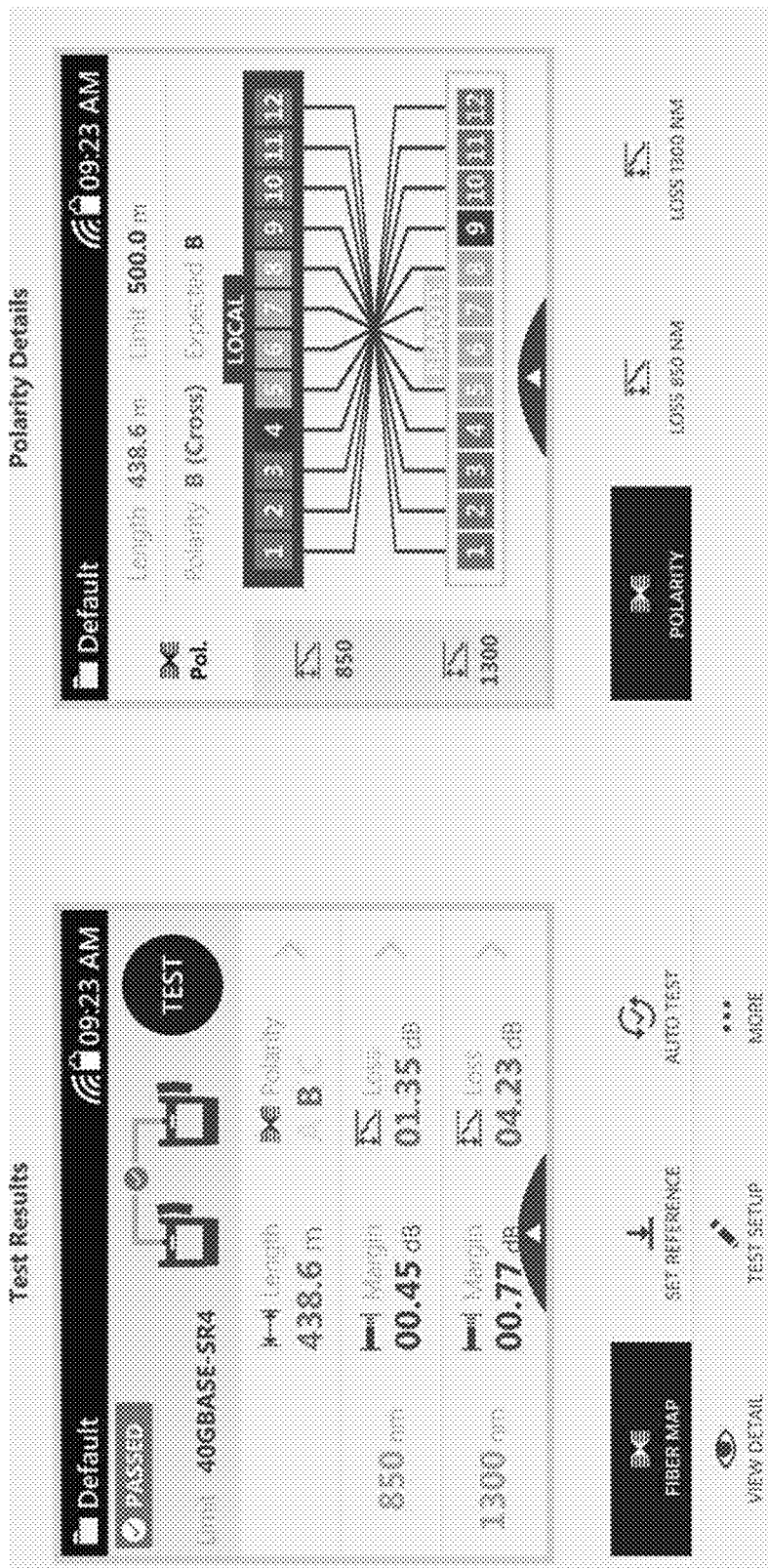

Referring to FIG. 11C, a GUI display for the MPO power meter 102 and/or the MPO source 104 may include information such as DUT length measurement, DUT polarity, and worst margins referred to dedicated test limits for each particular measured wavelength (e.g., 850 nm, 1300 nm, etc.). Further displays may also include a connection indication of the MPO power meter 102 and/or the MPO source 104 to the DUT 106, and a polarity type of the DUT 106.

Referring to FIG. 11D, a GUI display for the MPO power meter 102 and/or the MPO source 104 may include a polarity display associated with the DUT 106. For example, the polarity display (e.g., polarity-B) may include a connection of optical fiber-1 of the connector at the MPO source 104 to optical fiber-12 of the connector at the MPO power meter 102, connection of optical fiber-2 of the connector at the MPO source 104 to optical fiber-11 of the connector at the MPO power meter 102, etc. (and vise-versa).

Figures 11E, 11F:
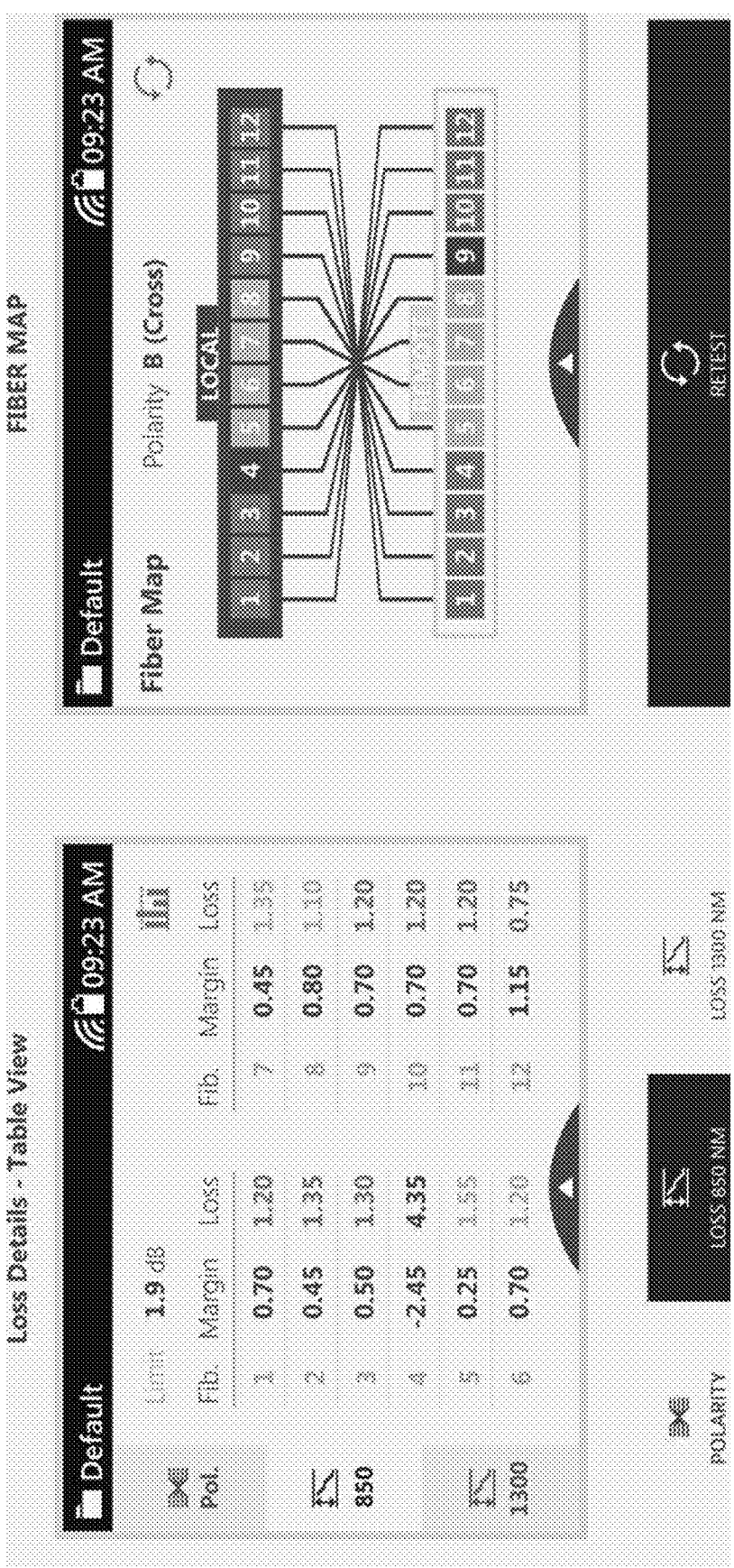

Referring to FIG. 11E, a GUI display for the MPO power meter 102 and/or the MPO source 104 may include loss readings for a particular measured wavelength (e.g., 850 nm or 1300 nm) associated with different optical fibers of the DUT 106.

Referring to FIG. 11F, a GUI display for the MPO power meter 102 and/or the MPO source 104 may include a polarity display associated with the DUT 106, based on re-testing of the polarity. For example, the polarity display (e.g., polarity-B) may include a connection of optical fiber-1 of the connector at the MPO source 104 to optical fiber-12 of the connector at the MPO power meter 102, connection of optical fiber-2 of the connector at the MPO source 104 to optical fiber-11 of the connector at the MPO power meter 102, etc. (and vise-versa).

Figures 11G, 11H:
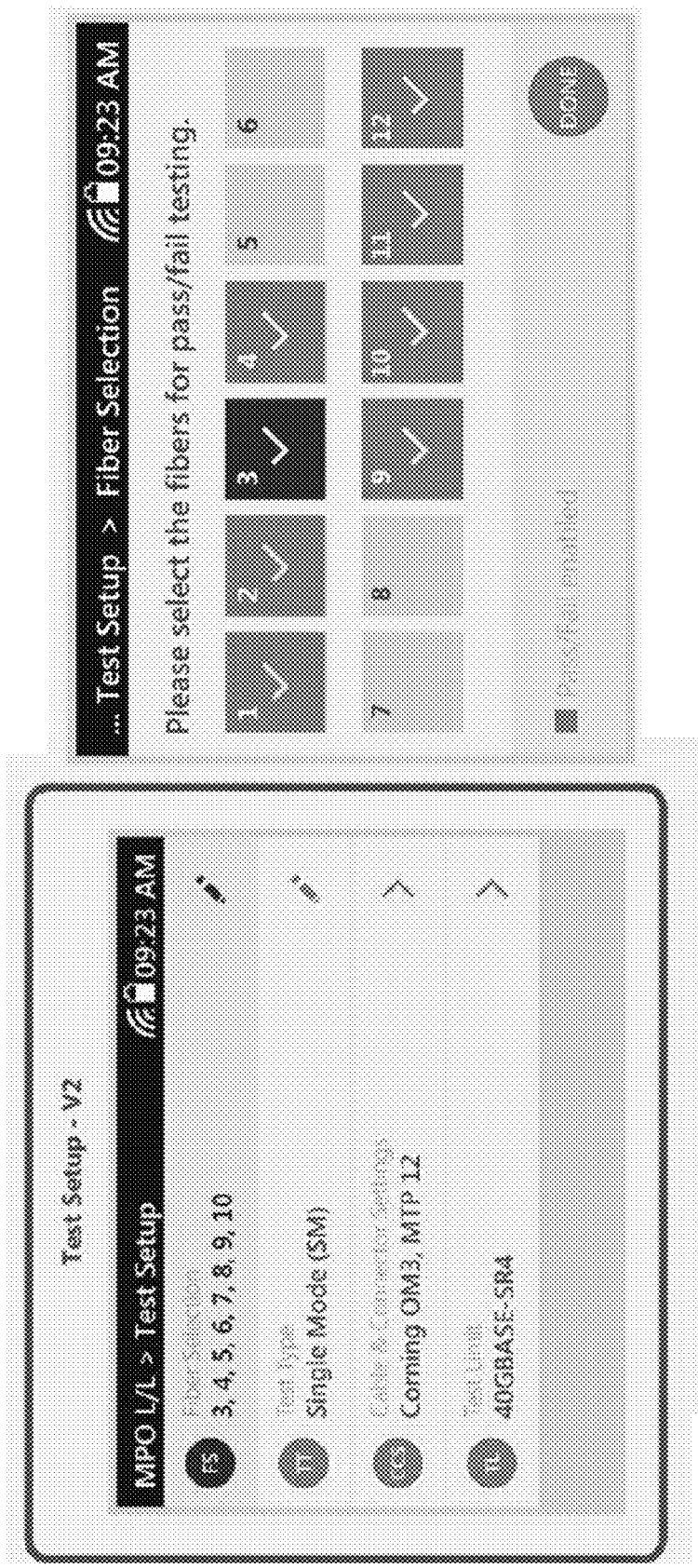

Referring to FIG. 11G, a GUI display for the MPO power meter 102 and/or the MPO source 104 may include testing options to select different optical fibers for testing, test type, type of cables, and test limits.

Referring to FIG. 11H, a GUI display for the MPO power meter 102 and/or the MPO source 104 may include icons which may be highlighted (or otherwise selected) to select different optical fibers for pass/fail testing. For example, the selection of optical fibers 1, 2, 3, 4, 9, 10, 11, and 12 has been highlighted.

Figures 11I, 11J:
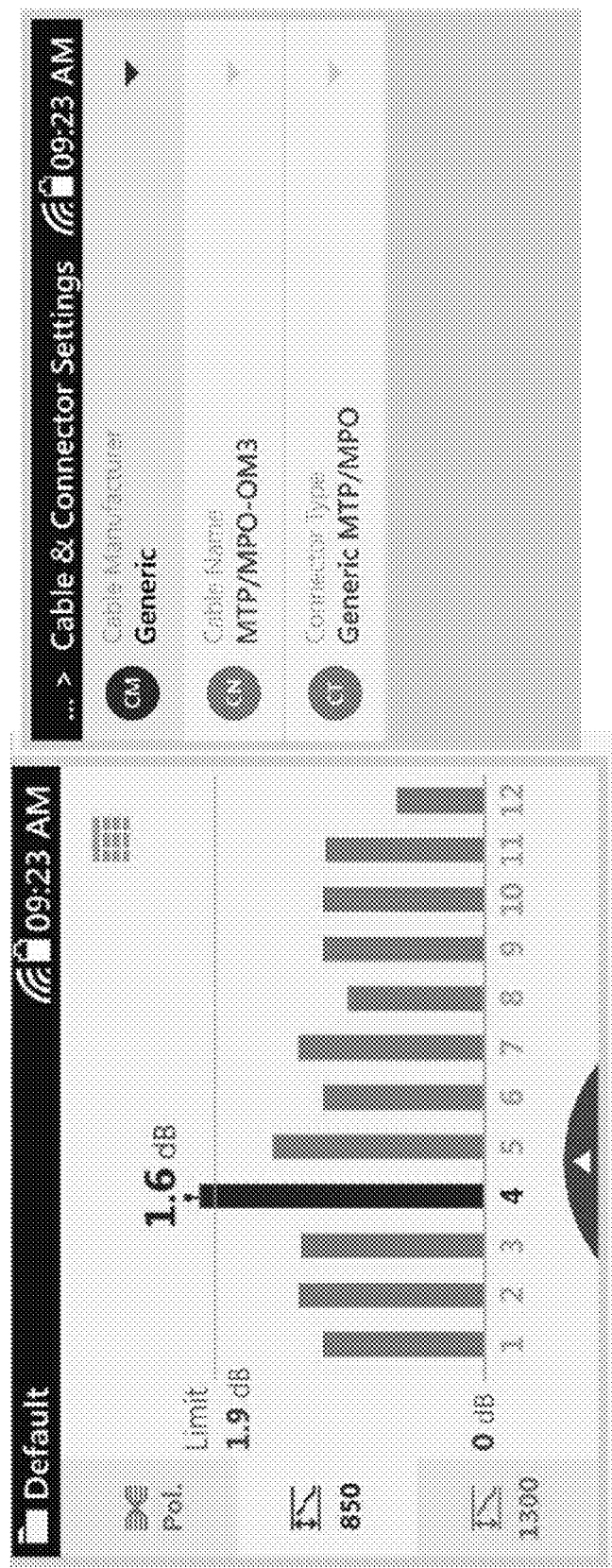

Referring to FIG. 11I, a GUI display for the MPO power meter 102 and/or the MPO source 104 may include options to display polarity, loss at a specified wavelength (e.g., 850 nm, 1100 nm, etc.). In the example of FIG. 11J, the loss may be displayed in a bar graph format.

Referring to FIG. 11J, a GUI display for the MPO power meter 102 and/or the MPO source 104 may include options to enter DUT (i.e., cable) information and connector settings. For example, the options may include cable manufacturer, cable name, connector type, etc., for different types of testing.

Figures 11K, 11L:
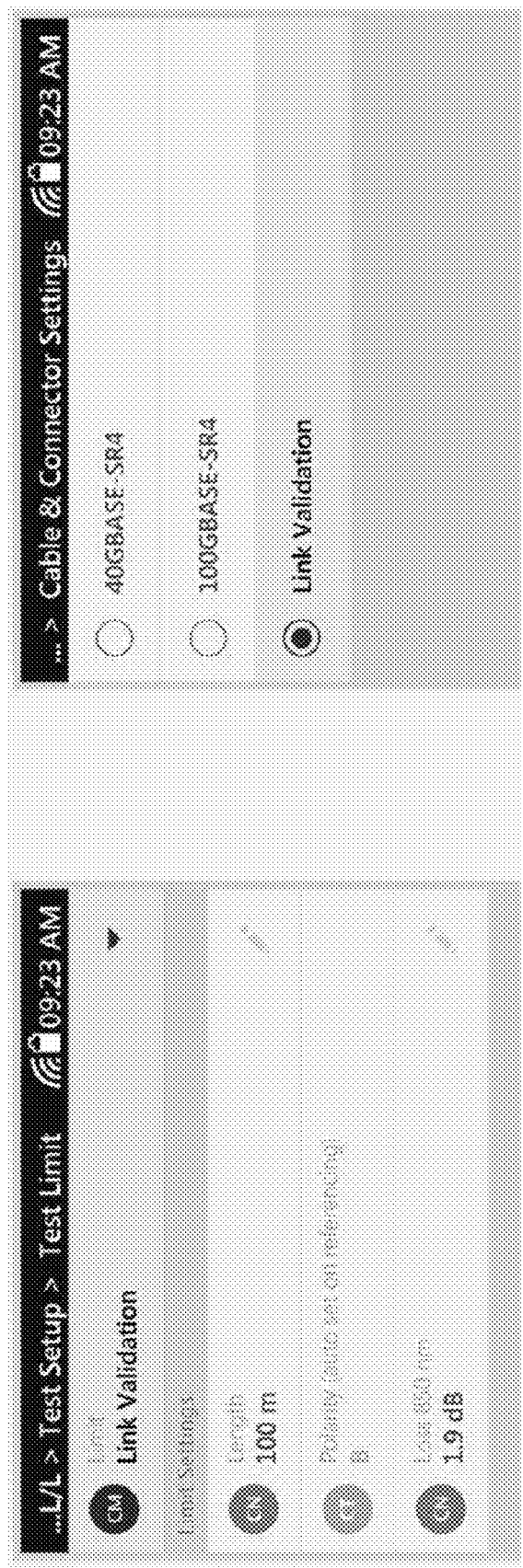

Referring to FIG. 11K, a GUI display for the MPO power meter 102 and/or the MPO source 104 may include options to specify test limits for different tests. The options may include, for example, length, polarity, loss, etc., associated with the DUT 106.

Referring to FIG. 11L, a GUI display for the MPO power meter 102 and/or the MPO source 104 may include options for DTU (i.e., cable) loss test limits referring to standards or individual loss test limits.

FIG. 12 illustrate a flowchart of a method 1200 for fiber-optic network analysis, according to examples. The method 1200 may be implemented on the MPO power meter 102 and/or the MPO source 104 described above with reference to FIGS. 1-11L by way of example and not limitation. The method 1200 may be practiced in other systems.

Referring to FIGS. 1-12, and particularly FIG. 12, at block 1202, the method 1200 may include implementing, via at least one optical fiber of a plurality of optical fibers of a multi-fiber cable (e.g., the DUT 106) that is to be analyzed by at least one of the MPO power meter 102 and the MPO source 104, the communication channel 108 by the MPO power meter 102 and the MPO source 104 to transmit data from the MPO power meter 102 to the MPO source 104 or from the MPO source 104 to the MPO power meter 102. The communication channel 108 may be operable independently from a polarity associated with the multi-fiber cable.

At block 1204, the method 1200 may include causing the data to be transmitted based on actuation of the MPO power meter 102 and/or the MPO source 104.

According to an example, the method 1200 may include transmitting, from the MPO power meter 102 to the MPO source 104 or from the MPO source 104 to the MPO power meter 102, an initial signal. The MPO power meter 102 or the MPO source 104 that transmits the initial signal may be designated as a transmitting sensor, and the MPO power meter 102 or the MPO source 104 that receives the initial signal may be designated as a receiving sensor. The method 1200 may further include transmitting, from the receiving sensor to the transmitting sensor, a mirrored signal that is generated based on an analysis of the initial signal. Further, the method 1200 may include determining, based on a comparison of a time delay between the initial signal and the mirrored signal to a reference time delay, a length of the multi-fiber cable (e.g., see discussion with respect to FIGS. 9 and 10).

According to an example, the method 1200 may include communicatively coupling, for the MPO power meter 102, a plurality of photodiodes to a plurality of optical fibers of the MPO power meter 102 (e.g., see FIGS. 2 and 6). Further, the method 1200 may include communicatively coupling, for the MPO power meter 102, at least one laser source to at least one of the plurality of optical fibers of the MPO power meter 102 by at least one corresponding splitter to implement the communication channel 108 between the MPO power meter 102 and the MPO source 104 (e.g., see FIGS. 2 and 6).

According to an example, for the method 1200, the plurality of optical fibers of the MPO power meter 102 may include twelve optical fibers, and the at least one laser source may further include three laser sources communicatively coupled to three of the plurality of optical fibers of the MPO power meter 102 by three corresponding splitters to implement the communication channel 108 between the MPO power meter 102 and the MPO source 104 (e.g., see FIGS. 2 and 6).

According to an example, the method 1200 may include communicatively coupling, for the MPO source 104, a laser source to a plurality of optical fibers of the MPO source 104 (e.g., see FIGS. 3 and 7). Further, the method 1200 may include communicatively coupling, for the MPO source 104, at least one photodiode to at least one of the plurality of optical fibers of the MPO source 104 by at least one corresponding splitter to implement the communication channel 108 between the MPO power meter 102 and the MPO source 104 (e.g., see FIGS. 3 and 7).

According to an example, for the method 1200, the plurality of optical fibers of the MPO source 104 may include twelve optical fibers, and the at least one photodiode further may include three photodiodes communicatively coupled to three of the plurality of optical fibers of the MPO source 104 by three corresponding splitters to implement the communication channel 108 between the MPO power meter 102 and the MPO source 104 (e.g., see FIGS. 3 and 7).

According to an example, the method 1200 may include causing transmission of commands via the communication channel 108 from the MPO power meter 102 to the MPO source 104 or from the MPO source 104 to the MPO power meter 102.

According to an example, the method 1200 may include causing transmission of instructions via the communication channel 108 from the MPO power meter 102 to the MPO source 104, and causing, based on the instructions, the MPO source 104 to be controlled by the MPO power meter 102.

According to an example, the method 1200 may include causing bi-directional transmission, via the communication channel 108, of a confirmation of a connection of the MPO source 104 and the MPO power meter 102 to the multi-fiber cable.

Figure 13:
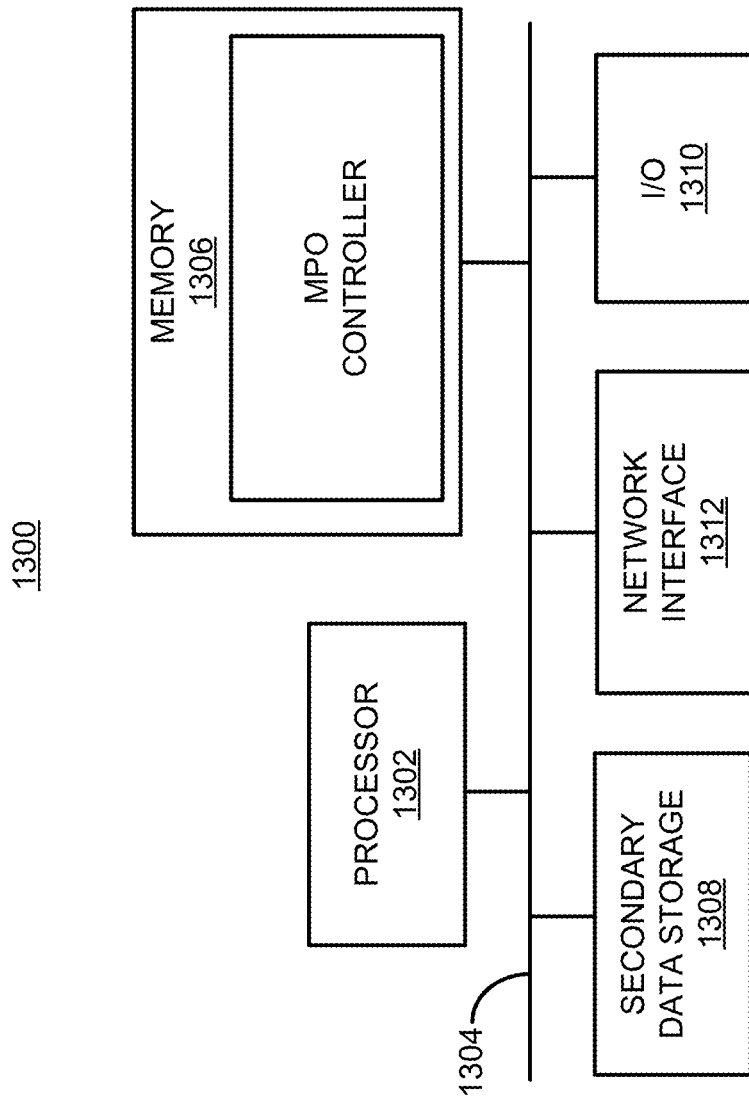
FIG. 13 illustrates a computer system, according to an example of the present disclosure.

FIG. 13 shows a computer system 1300 that may be used with the examples described herein. The computer system may represent a generic platform that includes components that may be in a server or another computer system. The computer system 1300 may be used as part of a platform for controllers of the MPO power meter 102 and/or the MPO source 104 (generally designated MPO controller). The computer system 1300 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 1300 may include a processor 1302 that may implement or execute machine readable instructions performing some or all of the methods, functions and other processes described herein. Commands and data from the processor 1302 may be communicated over a communication bus 1304. The computer system may also include a main memory 1306, such as a random access memory (RAM), where the machine readable instructions and data for the processor 1302 may reside during runtime, and a secondary data storage 1308, which may be non-volatile and stores machine readable instructions and data. The memory and data storage are examples of computer readable mediums. The main memory 1306 may include the MPO controller including machine readable instructions residing in the main memory 1306 during runtime and executed by the processor 1302.

The computer system 1300 may include an input/output (I/O) device 1310, such as a keyboard, a mouse, a display, etc. The computer system may include a network interface 1312 for connecting to a network. Other known electronic components may be added or substituted in the computer system.

The processor 1302 may be designated as a hardware processor. The processor 1302 may execute operations associated with various components of the MPO power meter 102 and/or the MPO source 104. For example, the processor 1302 may execute operations associated with the MPO controller, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A fiber-optic tester for testing a multi-fiber cable, the fiber-optic tester comprising:
   a fiber-optic testing receiver, wherein, for the fiber-optic testing receiver:
      at least one laser source is communicatively coupled to one or more selective optical fibers of a plurality of optical fibers connected to a connector, wherein a number of the one or more selective optical fibers is less than a total number of the plurality of optical fibers; and
      at least one photodiode is communicatively coupled to all of the plurality of optical fibers to implement a communication channel that is operable independently from a polarity associated with the multi-fiber cable, or
   a fiber-optic testing source, wherein, for the fiber-optic testing source:
      at least one other laser source is communicatively coupled to all of another plurality of optical fibers connected to another connector; and
      at least one other photodiode is communicatively coupled to one or more other selective optical fibers of the another plurality of optical fibers to implement the communication channel that is operable independently from the polarity associated with the multi-fiber cable, wherein a number of the one or more other selective optical fibers is less than a total number of the another plurality of optical fibers.

2. The fiber-optic tester according to claim 1, wherein for the fiber-optic testing source, the another plurality of optical fibers includes twelve optical fibers, and wherein the at least one other photodiode further comprises three photodiodes communicatively coupled to three of the another plurality of optical fibers by three corresponding splitters to implement the communication channel between the fiber-optic tester that is the fiber-optic testing source and the fiber-optic testing receiver.

3. The fiber-optic tester according to claim 2, wherein for the fiber-optic testing source, the communication channel is operable independently from three polarities including the polarity associated with the multi-fiber cable, and wherein the polarities include a polarity-A for which a first optical fiber of the twelve optical fibers associated with the another connector is communicatively coupled to a first optical fiber associated with the connector of the fiber-optic testing receiver that includes twelve optical fibers, a polarity-B for which a twelfth optical fiber associated with the another connector of the fiber-optic tester is communicatively coupled to the first optical fiber associated with the connector of the fiber-optic testing receiver, and a polarity-C for which a second optical fiber associated with the another connector of the fiber-optic tester is communicatively coupled to the first optical fiber associated with the connector of the fiber-optic testing receiver.

4. The fiber-optic tester according to claim 1, wherein for the fiber-optic testing source, the communication channel implemented by the at least one other laser source and the at least one other photodiode is to provide bi-directional transmission of data between the fiber-optic tester that includes the fiber-optic testing source and the fiber-optic testing receiver.

5. The fiber-optic tester according to claim 1, wherein for the fiber-optic testing source, the communication channel implemented by the at least one other laser source and the at least one other photodiode is to provide transmission of commands between the fiber-optic tester that includes the fiber-optic testing source and the fiber-optic testing receiver.

6. The fiber-optic tester according to claim 5, wherein a command of the commands includes instructions from the fiber-optic tester to control operations of the fiber-optic testing receiver.

7. The fiber-optic tester according to claim 1, wherein for the fiber-optic testing source, the communication channel implemented by the at least one other laser source and the at least one other photodiode is to provide bi-directional transmission of a confirmation of a connection of the fiber-optic tester that includes the fiber-optic testing source and the fiber-optic testing receiver to the multi-fiber cable.

8. The fiber-optic tester according to claim 1, wherein the another connector is a Multi-fiber Push On (MPO) connector.

9. The fiber-optic tester according to claim 1, wherein for the fiber-optic testing receiver, the plurality of optical fibers includes twelve optical fibers, and wherein the at least one laser source further comprises three laser sources communicatively coupled to three of the plurality of optical fibers by three corresponding splitters to implement the communication channel between the fiber-optic tester that is the fiber-optic testing receiver and the fiber-optic testing source.

10. The fiber-optic tester according to claim 9, wherein for the fiber-optic testing receiver, the communication channel is operable independently from three polarities including the polarity associated with the multi-fiber cable, and wherein the polarities include a polarity-A for which a first optical fiber of the twelve optical fibers associated with the connector is communicatively coupled to a first optical fiber associated with the connector of the fiber-optic testing source that includes twelve optical fibers, a polarity-B for which a twelfth optical fiber associated with the connector of the fiber-optic tester is communicatively coupled to the first optical fiber associated with the connector of the fiber-optic testing source, and a polarity-C for which a second optical fiber associated with the connector of the fiber-optic tester is communicatively coupled to the first optical fiber associated with the connector of the fiber-optic testing source.

11. The fiber-optic tester according to claim 1, wherein for the fiber-optic testing receiver, the communication channel implemented by the at least one laser source and the at least one photodiode is to provide bi-directional transmission of data between the fiber-optic tester that includes the fiber-optic testing receiver and the fiber-optic testing source.

12. A method comprising:
implementing, via at least one optical fiber of a plurality of optical fibers of a multi-fiber cable that is to be analyzed by at least one of a power meter or a source, a communication channel by the power meter and the source to transmit data from the power meter to the source or from the source to the power meter, wherein the communication channel is operable independently from a polarity associated with the multi-fiber cable;
transmitting, from the power meter to the source or from the source to the power meter, an initial signal, wherein the power meter or the source that transmits the initial signal is designated as a transmitting sensor, and the power meter or the source that receives the initial signal is designated as a receiving sensor;
transmitting, from the receiving sensor to the transmitting sensor, a mirrored signal that is generated based on an analysis of the initial signal; and
determining, based on a comparison of a time delay between the initial signal and the mirrored signal to a reference time delay, a length of the multi-fiber cable.

13. The method according to claim 12, further comprising:
communicatively coupling, for the power meter, a plurality of photodiodes to a plurality of optical fibers of the power meter; and
communicatively coupling, for the power meter, at least one laser source to at least one of the plurality of optical fibers of the power meter by at least one corresponding splitter to implement the communication channel between the power meter and the source.

14. The method according to claim 13, wherein the plurality of optical fibers of the power meter includes twelve optical fibers, and wherein the at least one laser source further comprises three laser sources communicatively coupled to three of the plurality of optical fibers of the power meter by three corresponding splitters to implement the communication channel between the power meter and the source.

15. The method according to claim 12, further comprising:
communicatively coupling, for the source, a laser source to a plurality of optical fibers of the source; and
communicatively coupling, for the source, at least one photodiode to at least one of the plurality of optical fibers of the source by at least one corresponding splitter to implement the communication channel between the power meter and the source.

16. The method according to claim 15, wherein the plurality of optical fibers of the source includes twelve optical fibers, and wherein the at least one photodiode further comprises three photodiodes communicatively coupled to three of the plurality of optical fibers of the source by three corresponding splitters to implement the communication channel between the power meter and the source.

17. The method according to claim 12, further comprising:
causing transmission of commands via the communication channel from the power meter to the source or from the source to the power meter.

18. A Multi-fiber Push On (MPO) tester for testing a multi-fiber cable, the MPO tester comprising:
a fiber-optic testing receiver, wherein, for the fiber-optic testing receiver:
at least one laser source is communicatively coupled, based on a specified communication channel that is selected from a plurality of available communication channels, to one or more selective optical fibers of a plurality of optical fibers connected to a connector; and
at least one photodiode is communicatively coupled, based on the specified communication channel that is selected from the plurality of available communication channels, to all of the plurality of optical fibers to implement the specified communication channel that is operable independently from a polarity associated with the multi-fiber cable, or
a fiber-optic testing source, wherein, for the fiber-optic testing source:
at least one other laser source is communicatively coupled to all of another plurality of optical fibers connected to another connector; and
at least one other photodiode is communicatively coupled to one or more other selective optical fibers of the another plurality of optical fibers to implement the communication channel that is operable independently from the polarity associated with the multi-fiber cable.

19. The MPO tester according to claim 18, wherein for the fiber-optic testing source, the another plurality of optical fibers includes twelve optical fibers, and wherein the at least one other photodiode further comprises three photodiodes communicatively coupled to three of the another plurality of optical fibers by three corresponding splitters to implement the specified communication channel between the MPO tester that is the fiber-optic testing source and the fiber-optic testing receiver.

20. The MPO tester according to claim 18, wherein for the fiber-optic testing receiver, the plurality of optical fibers includes twelve optical fibers, and wherein the at least one laser source further comprises three laser sources communicatively coupled to three of the plurality of optical fibers by three corresponding splitters to implement the specified communication channel between the MPO tester that is the fiber-optic testing receiver and the fiber-optic testing source.

* * * * *